US011115286B2

(12) United States Patent
Kumar et al.

(10) Patent No.: US 11,115,286 B2
(45) Date of Patent: Sep. 7, 2021

(54) AUTOMATIC DISCOVERY OF IP-OPTICAL LINKS WITH MULTI-LAYER FILTERING AND TRAFFIC MAPPING USING NEURAL NETWORKS

(71) Applicant: NOKIA SOLUTIONS AND NETWORKS OY, Espoo (FI)

(72) Inventors: Rakesh Kumar, Bangalore (IN); Sumanth MS, Bangalore (IN); Joshi Sravan Kumar K, Bangalore (IN)

(73) Assignee: NOKIA SOLUTIONS NETWORKS OY, Espoo (FI)

( * ) Notice: Subject to any disclaimer, the term of this patent is extended or adjusted under 35 U.S.C. 154(b) by 244 days.

(21) Appl. No.: 16/365,201

(22) Filed: Mar. 26, 2019

(65) Prior Publication Data
US 2020/0313972 A1 Oct. 1, 2020

(51) Int. Cl.
| | |
|---|---|
| *G06F 15/16* | (2006.01) |
| *H04L 12/24* | (2006.01) |
| *H04L 12/715* | (2013.01) |
| *G06N 3/04* | (2006.01) |
| *H04J 14/02* | (2006.01) |
| *G06N 20/20* | (2019.01) |
| *G06N 3/08* | (2006.01) |

(52) U.S. Cl.
CPC .......... *H04L 41/12* (2013.01); *G06N 3/0454* (2013.01); *G06N 3/084* (2013.01); *G06N 20/20* (2019.01); *H04J 14/0267* (2013.01); *H04L 41/16* (2013.01); *H04L 45/04* (2013.01); *H04L 45/64* (2013.01)

(58) Field of Classification Search
CPC ....... H04L 45/64; H04L 45/62; H04L 45/507; H04L 45/04; H04L 41/16; H04L 41/12; H04L 41/0893; H04J 14/0267; G06N 3/084; G06N 3/08; G06N 3/0454; G06N 20/20
See application file for complete search history.

(56) References Cited

U.S. PATENT DOCUMENTS

| | | |
|---|---|---|
| 9,755,948 B1 * | 9/2017 | Viljoen ................. H04Q 11/00 |
| 2002/0063916 A1 | 5/2002 | Chiu et al. |
| 2014/0115154 A1 | 4/2014 | Mack-Crane et al. |

(Continued)

FOREIGN PATENT DOCUMENTS

| | | |
|---|---|---|
| EP | 3 038 303 A1 | 6/2016 |
| WO | 2016/056002 A2 | 4/2016 |

OTHER PUBLICATIONS

"Architectures for a Multi-Vendor IP-Optical Control Solution", Sedona Systems, Open Networking Summit 2016, 21 pages.

(Continued)

*Primary Examiner* — Normin Abedin
(74) *Attorney, Agent, or Firm* — Kramer Amado PC

(57) ABSTRACT

A method of identifying IP-optical links in a network having a plurality of nodes, including: grouping network nodes into discovery groups; for each group filtering ports of the nodes in the discovery group; for each group producing class IDs for each filtered port using a machine learning model; for each group matching IP ports to optical ports from the filtered ports using the class IDs for each port to identify IP-optical links; and verifying identified IP-optical links.

20 Claims, 4 Drawing Sheets

(56) References Cited

U.S. PATENT DOCUMENTS

2016/0359676 A1* 12/2016 Ceccarelli ........... H04L 41/0677
2018/0302152 A1* 10/2018 Shikhmanter ....... H04L 43/0882

OTHER PUBLICATIONS

"Netfusion Discovery Datasheet", Sedona Systems, 4 pages. (2017).
"Netfusion IP/Optical Visibility and Control Solution Brief", Sedona Systems, 4 pages. (2017).
"Patentability Search Report", Automatic Discovery of IP-Optical Links With Multi-Layer Filtering and Traffic Mapping Using Neural Networks, CPA Global, 22 pages. (dated Jun. 12, 2018).
"Patentability Search Report", Automatic Discovery of IP-Optical Links with Multi-Layer Filtering and Traffic mapping using Neural networks, Effectual Knowledge Services Pvt. Ltd, pp. 1-29. (dated Sep. 17, 2018).
MATA, "Artificial Intelligence (AI) Methods in Optical Networks: A Comprehensive Survey", Optical Switching and Networking, 17 pages. (Jan. 26, 2018).

* cited by examiner

AUTOMATIC DISCOVERY OF IP-OPTICAL LINKS WITH MULTI-LAYER FILTERING AND TRAFFIC MAPPING USING NEURAL NETWORKS

TECHNICAL FIELD

Various exemplary embodiments disclosed herein relate generally to automatic discovery of IP-optical links with multi-layer filtering and traffic mapping using neural networks.

BACKGROUND

In traditional deployments, networks in IP and Optical layers are managed separately. In order to deliver services faster and to manage the entire network efficiently, it is essential that networks in IP and optical layers are viewed and managed together. This is achieved by cross domain SDN controller that has visibility of services, tunnels and other connections at both the IP and optical layers. The cross domain SDN controller correlates the services at IP layer to services at optical layer using the inter domain links between IP routers and optical switches. Once this is done, the SDN domain controller may take actions in order to influence a better network control decision at IP layer, like finding optically disjoint paths, rerouting LSPs in case of failure at optical layer, efficient link utilization, etc.

Hence, inter domain links act like conduit between IP and optical networks and play an important role in co-relating IP and optical services. Inter domain links may be manually provisioned by the user or automatically discovered in cross domain SDN controllers. Manual provisioning is error prone, cumbersome, and time consuming. Hence, automatic discovery is preferred.

BRIEF DESCRIPTION OF THE DRAWINGS

In order to better understand various exemplary embodiments, reference is made to the accompanying drawings, wherein.

To facilitate understanding, identical reference numerals have been used to designate elements having substantially the same or similar structure and/or substantially the same or similar function.

SUMMARY

Figure 1:
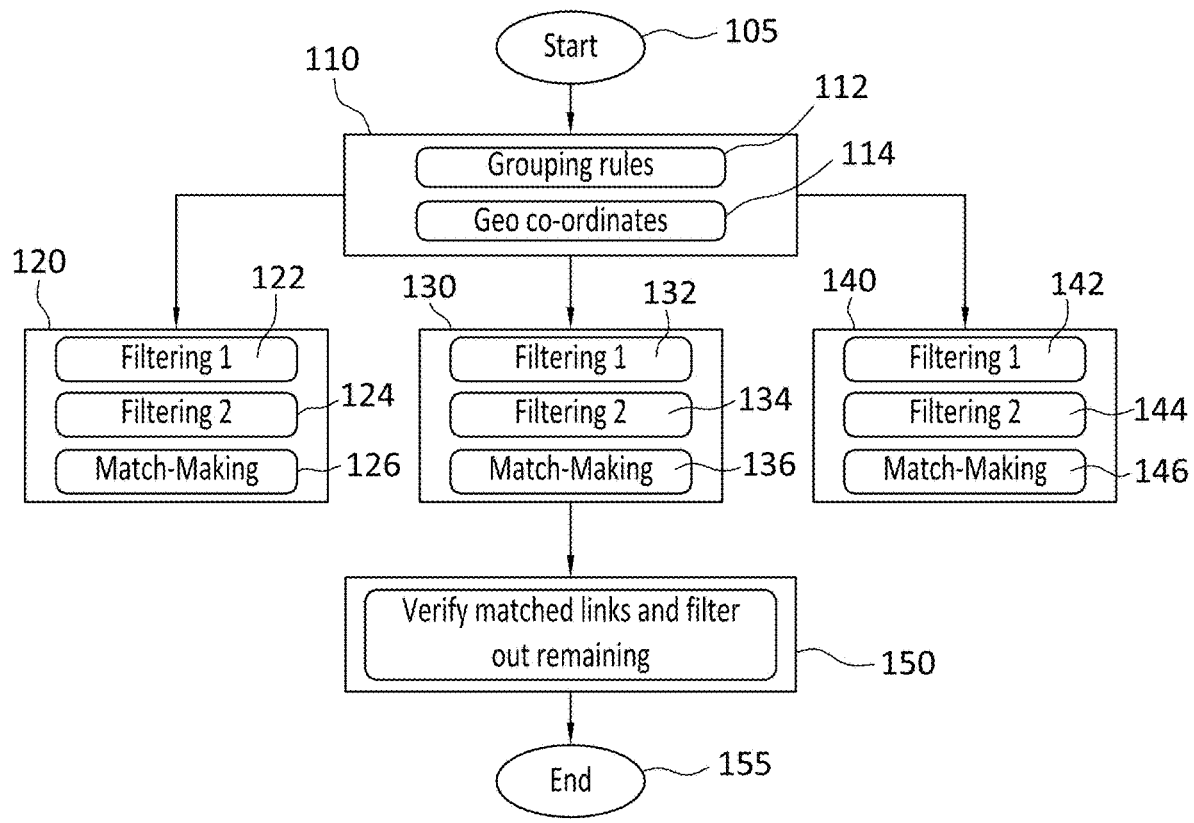
FIG. 1 illustrates the steps carried out by the link discovery system to discover inter domain links.

A summary of various exemplary embodiments is presented below. Some simplifications and omissions may be made in the following summary, which is intended to highlight and introduce some aspects of the various exemplary embodiments, but not to limit the scope of the invention. Detailed descriptions of an exemplary embodiment adequate to allow those of ordinary skill in the art to make and use the inventive concepts will follow in later sections.

Various embodiments relate to a method of identifying IP-optical links in a network having a plurality of nodes, including: grouping network nodes into discovery groups; for each group: filtering ports of the nodes in the discovery group; producing class IDs for each filtered port using a machine learning model; matching IP ports to optical ports from the filtered ports using the class IDs of each port to identify IP-optical links; and verifying identified IP-optical links.

Various embodiments are described, wherein grouping of network nodes into discovery groups includes using k-means based on the client ports of the optical devices connecting to the IP devices.

Various embodiments are described, wherein grouping of network nodes into discovery groups includes receiving a radial distance and identifying all the nodes in the network that fall within the received radial distance.

Various embodiments are described, wherein filtering the ports includes removing all ports with no traffic.

Various embodiments are described, wherein filtering the ports includes removing all IP-IP connected ports in a discovery group which have link layer discovery protocol (LLDP) peer ports.

Various embodiments are described, wherein producing class IDs for each filtered port includes: collecting a sequence of time-sampled data from all of the ports and forming an image using the collected data; assigning different class IDs to all of the Tx ports; training the machine learning model to learn the class ID for each of the Tx ports using the images formed for the Tx ports; and inputting the images for all of the Rx ports into the machine learning model to assign a class ID to each of the Rx ports.

Various embodiments are described, wherein the machine learning model is a convolutional neural network model.

Various embodiments are described, wherein verifying identified IP-optical links includes tracing the IP-optical-IP path and comparing the traced IP-optical-IP path with the corresponding LLDP/IGP session between the indirectly connected IP nodes.

Various embodiments are described, wherein verifying the manually added IP-Optical links to the SDN controller by tracing the IP-Optical-IP path with the corresponding LLD/IGP session between the indirectly connected IP nodes.

Further various embodiments relate to a software defined network (SDN) controller for identifying IP-optical links in a network having a plurality of nodes, including: a memory; and a processor connected to the memory, wherein the processor is configured to: group network nodes into discovery groups; for each group: filter ports of the nodes in the discovery group; produce class IDs for each filtered port using a machine learning model; match IP ports to optical ports from the filtered ports using the class IDs of each port to identify IP-optical links; and verify identified IP-optical links.

The SDN controller of claim 10, wherein grouping of network nodes into discovery groups includes using k-means based on the client ports of the optical devices connecting to the IP devices.

Various embodiments are described, wherein grouping of network nodes into discovery groups includes receiving a radial distance and identifying all the nodes in the network that fall within the received radial distance.

Various embodiments are described, wherein filtering the ports includes removing all ports with no traffic.

Various embodiments are described, wherein filtering the ports includes removing all IP-IP connected ports in a discovery group which have link layer discovery protocol (LLDP) peer ports.

Various embodiments are described, wherein producing class IDs for each filtered port includes: collecting a sequence of time-sampled data from all of the ports and forming an image using the collected data; assigning different class IDs to all of the Tx ports; training the machine learning model to learn the class ID for each of the Tx ports using the images formed for the Tx ports; and inputting the images for all of the Rx ports into the machine learning model to assign a class ID to each of the Rx ports.

Various embodiments are described, wherein the machine learning model is a convolutional neural network model.

Various embodiments are described, wherein verifying identified IP-optical links includes tracing the IP-optical-IP path and comparing the traced IP-optical-IP path with the corresponding LLDP/IGP session between the indirectly connected IP nodes.

Various embodiments are described, wherein verifying the manually added IP-Optical links to the SDN controller by tracing the IP-Optical-IP path with the corresponding LLD/IGP session between the indirectly connected IP nodes.

A non-transitory machine-readable storage medium encoded with instructions for execution by a software defined network controller, the non-transitory machine-readable storage medium including: instructions for grouping network nodes into discovery groups; for each group: instructions for filtering ports of the nodes in the discovery group; instructions for producing class IDs for each filtered port using a machine learning model; instructions for matching IP ports to optical ports from the filtered ports using the class IDs of each port to identify IP-optical links; and instructions for verifying identified IP-optical links.

Various embodiments are described, wherein filtering the ports includes removing all IP-IP connected ports in a discovery group which have link layer discovery protocol (LLDP) peer ports.

DETAILED DESCRIPTION

The description and drawings illustrate the principles of the invention. It will thus be appreciated that those skilled in the art will be able to devise various arrangements that, although not explicitly described or shown herein, embody the principles of the invention and are included within its scope. Furthermore, all examples recited herein are principally intended expressly to be for pedagogical purposes to aid the reader in understanding the principles of the invention and the concepts contributed by the inventor(s) to furthering the art and are to be construed as being without limitation to such specifically recited examples and conditions. Additionally, the term, "or," as used herein, refers to a non-exclusive or (i.e., and/or), unless otherwise indicated (e.g., "or else" or "or in the alternative"). Also, the various embodiments described herein are not necessarily mutually exclusive, as some embodiments can be combined with one or more other embodiments to form new embodiments.

In typical communication networks optical devices are transparent to routers and switches. Routers and switches work at layer 3 and Layer 2 respectively. Whereas optical devices work at layer 1. As for the open systems interconnection (OSI) layer abstraction concept, traditional optical devices were designed to not to snoop the Layer 2 content of switches/routers. Because of this traditional design, optical devices cannot understand the layer 2 link layer discovery protocol (LLDP). It transparently passes on the LLDP packets considering it as payload data.

As part of recent advancements, new optical devices can understand the LLDP by snooping or by acting as a LLDP neighbor similar to a switch or a router. But today most of the optical devices in field are older generation equipment which cannot understand the LLDP With the advent of cross-domain SDN controllers there is a need for a SDN controller to understand the full IP-Optical topology in the absence of LLDP also. Because, deployed devices at IP-Optical interchange, cannot be replaced within a short time and would be cost prohibitive, there remains a need for a technology which may help in finding the IP-optical connected links. Embodiments of a solution using analytics and without need of change of hardware will be disclosed herein that helps find the IP-optical connected links in a network.

There is no single way to discover inter domain links between IP routers/switches and optical devices. LLDP is used to discover links in IP Domain. However, LLDP is not used in the optical domain and very few transponders on optical switch support the LLDP protocol.

Because very few new transponders on optical switches support LLDP protocol, currently the service providers need to manually configure the inter domain links in cross domain SDN controller to make the cross domain SDN use case work.

When cross-domain links are added manually to cross domain SDN controller, changes occurring in the actual network will not get reflected in the cross domain SDN controller. This affects subsequent computation by the SDN controller. The only remedy is to manually rectify each such issue in the cross domain SDN controller.

Cross domain SDN controllers can be connected to northbound interface such as hierarchical controllers. In such case cross domain SDN controller can be impacted due to incorrect topology as mentioned in point [0015]. Subsequently, the delayed manual rectification of a cross domain link may have a cascading or exploding adverse effect of having to deal with a multitude of such hierarchical network components. Fixing the issue as soon as it is discovered will prevent the cascading/exploding effect. This leads to a need for an algorithm that may efficiently find the cross-domain link that connects IP-optical link in the absence of LLDP.

Links may be discovered by analyzing the traffic flow patterns at connected IP and optical ports and correlating based on trends. But this method is based on normal heuristics and does not always yield accurate results.

With the constraints explained above, it is important to discover inter domain links by running a heuristic algorithm that provides increased link discovery accuracy. Also, a fast and scalable discovery method for large networks is needed through which links are discovered by running algorithms that can run in parallel. The embodiments described herein provide these features.

A link discovery system discovers inter domain links using a divide and conquer method to achieve parallelism. Link discovery is divided into multiple stages, with each stage having a specific goal. A stage completes after all algorithms are executed. Subsequently, the next stage is invoked. New stages and new algorithms may be introduced anytime without impacting the overall flow and existing algorithms.

In the first stage, the network to be analyzed is divided into smaller areas called discovery groups based on grouping algorithms. Each group includes a set of IP routers and optical switches. Then, algorithm chains may be invoked on each of these groups in parallel. And algorithm can also be invoked on smaller parts of network, for example, when a port parameter is changed on an IP router, the impacted port on optical side may be searched for only within the discovery group instead of the whole network.

A convolutional neural network (CNN) model using deep learning is used for link discovery to provide more accuracy over heuristic algorithms. While a CNN is used herein as an example, other applicable machine learning methods may be applied as well.

FIG. 1 illustrates the steps carried out by the link discovery system to discover inter domain links. The discovery of inter domain IP-optical links is divided into a grouping stage 110, a matching/filtering stage 120, 130, 140, and a validation stage 150. While three instantiations of the matching/filtering stage are shown, fewer or more instantiations may be used in order to parallelize the link discovery process.

In the discovery stage 110 the entire network is divided into smaller discovery groups by executing a set of grouping algorithms such as K-means algorithm considering the Optical client ports[optical client ports are the ports from the optical side connecting to IP devices]. Each group includes a few IP routers and optical switches. The goal of this stage is only to divide the network into smaller groups, which makes the process of link discovery easier and allows for parallel processing.

The discovery stage 110 may receive four boundary geo coordinates 114 as input. These four-boundary geo coordinates may be considered in such a way such that an IP port and its corresponding optical link port should be part of same group. The discovery stage 110 identifies nodes within the geo coordinate boundaries. For parallel computation, multiple different four-boundary geo coordinate sets may be fed into to the discovery stage 110 and processed in parallel using separate processing resources. Alternatively, the geographic area of interest may be specified by a specific location or geo coordinate and a radial distance, such that any node within the entire circle specified by the radial distance may be part of the group processing. Radial distance is the distance from the cluster with in which all the nodes need to be considered.

Figure 2:
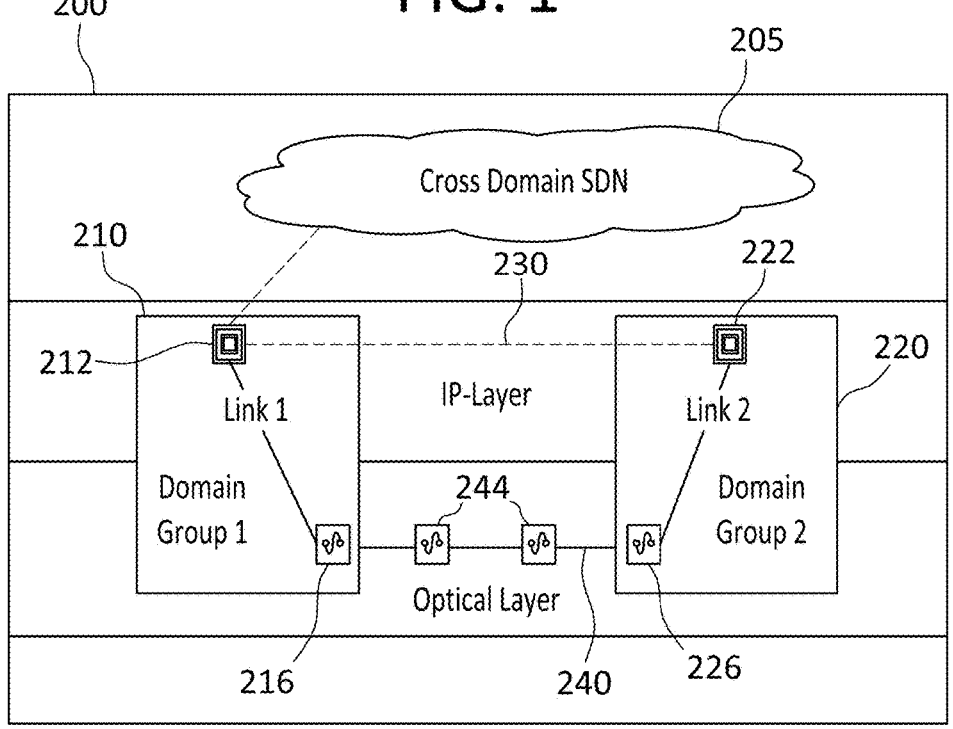
FIG. 2 illustrates a network with a linked layer interfaces L1 and L2.

FIG. 2 illustrates a network with a linked layer interfaces L1 and L2. In FIG. 2 the network 200 has a domain group 1 210 and a domain group 2 220. The domain groups are identified and controlled by the cross domain SDN 205. Domain group 1 210 includes a router node 212 connected to the IP-layer 230 and also to the optical node 216 via link 1. Domain group 2 220 includes a router node 222 connected to the IP-layer 230 and also to the optical node 226 via link 2. The optical nodes 216 and 226 are connected to the optical layer 240 which may further include optical nodes 244.

Now the matching/filtering stages 120, 130, and 140 will be described. The matching/filtering stage may be broken up in to filter part 1 122, 132, 142, filtering part 2, 124, 134, 144, and a match making part 126, 136, 146.

In filtering part 1 122, 132, 142 all the ports which have zero traffic may be filtered out, because a heuristic algorithm cannot be applied to identify the connecting peer cross domain ports which do not have traffic, and such ports are not of interest for the cross domain SDN until the port sends traffic.

In filtering part 2 124, 134, 144, from the above precondition, it is clear that all the ports which have LLDP peer ports within the k-means identified group boundary are pure IP-IP interfaces because the LLDP only runs on such pure IP-IP interfaces. Therefore, pure IP-IP interfaces may be removed from consideration in the next stage as the intention is to find IP-optical connecting links. The LLDP/IGP peer of an IP port connecting via optical will always be part of a different discovery group.

Figure 3:
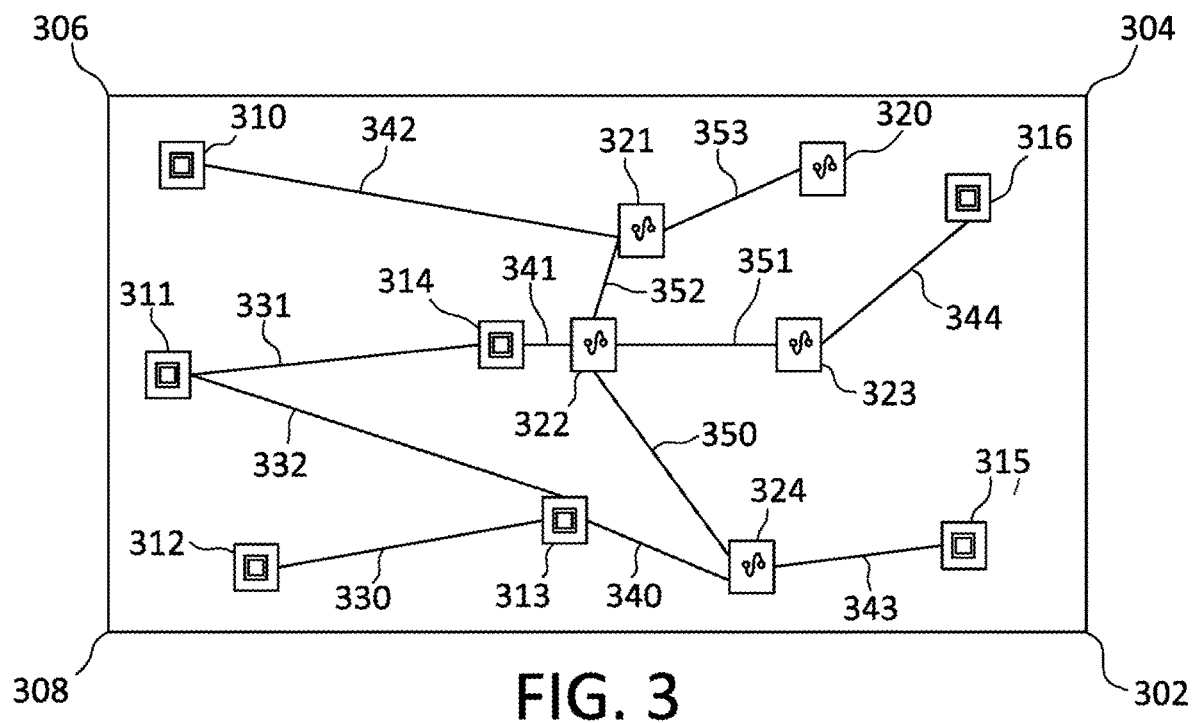
FIG. 3 shows an example of a discovery domain group discovered by K-means.

FIG. 3 shows an example of a discovery domain group discovered by k-means methods. The discovery domain group 300 includes a number of routers 310-316 and a number of optical nodes 320-324. The discovery domain group 300 includes three IP-IP links 330, 331, and 332. These three links will be filtered out in the filtering step mentioned in [0028]. The discovery domain group 300 includes four optical to optical links 350-353 which are not part of the discovery process. The discovery domain group 300 includes five IP-optical links 340-344. These are the links that the match making part will seek to find.

The match making part will now be described. It is noted that the Tx counters from the optical port should match with the Rx counters of the IP port when those ports are connected. This information may be used to identify IP-optical links. Within a domain discovery group, the two filtering steps are performed leaving a set of remaining IP ports which may be considered as potential Rx ports among all the IP ports, connected to given optical ports. Now the solution is to find the exact Rx port among the potential Rx ports to match with a given Tx client of an optical port. It is noted that client optical ports are the only ports from optical nodes which are connected to the IP devices.

Figure 4:
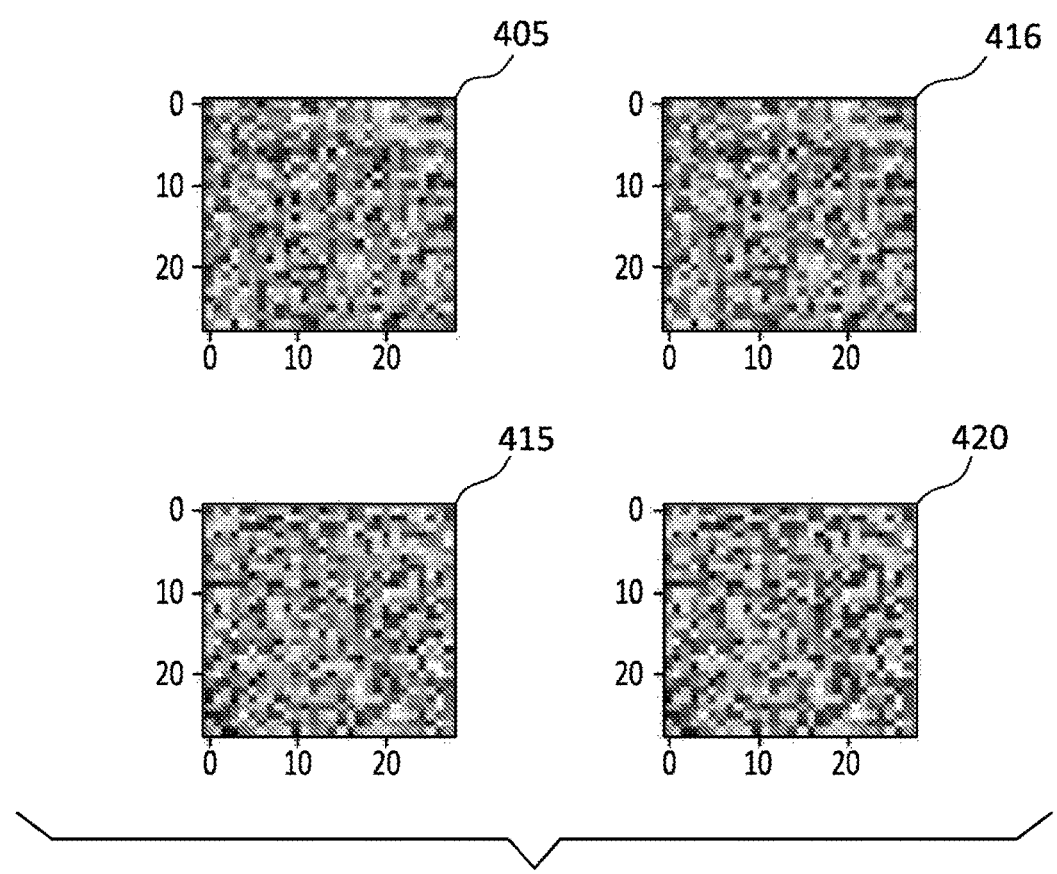
FIG. 4 depicts four images showing the sequences of time-sampled data for some Tx ports and Rx ports.

For matching the exact Rx ports from the potential list of Rx ports with corresponding Tx client optical ports, a deep learning model using convolutional neural network (CNN) may be used. CNN is a form of neural network used for processing image. Matching of Tx and Rx ports can be thought of as matching an image formed by the sequence of time-sampled data at the Tx ports with that of Rx ports. FIG. 4 depicts four images showing the sequences of time-sampled data for some Tx ports and Rx ports. The images include pixels that indicate the number of messages received/transmitted by the port during a specified time period. Each pixel represents that data for a specific time. The image 405 illustrates the time sequence data for a first optical port, and the image 416 illustrates the time sequence data for a first IPport that is connected to the first Optical port. As can be seen, the images 405 and 416 are essentially identical. Images 415 and 420 provide the same sort of data for a second optical port connected to a second IP port, and again the two images match.

CNN is used because it is good at recognizing patterns that may exhibit extreme variability, and CNN recognizes these patterns with robustness in the presence of small distortions. CNN also allows for parallelization, because each section of the image operated on by the convolutional kernel is independent of the other sections in the image, so that the entire image may be processed in parallel at the same time.

The convolution operation is applied using below expression:

$$S = (I * K)(i, j) = \sum_m \sum_n I(i+m, j+n) K(m, n),$$

where I is the input and K is referred to as the kernel. The output S is referred to as the feature map.

Figure 5:
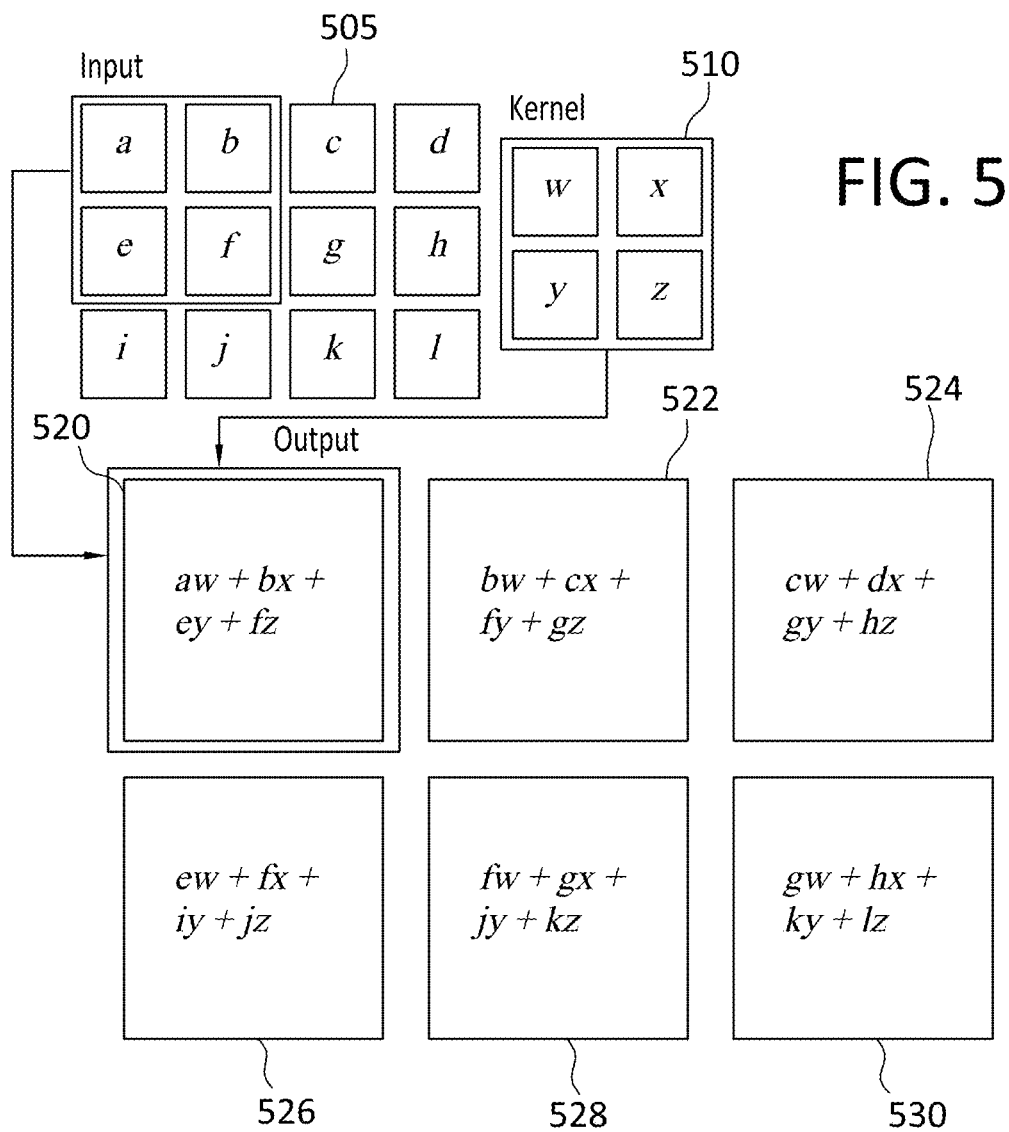
FIG. 5 illustrates a simple 2-D convolution.

FIG. 5 illustrates a simple 2-D convolution. A convolution is executed by sliding the kernel over the input. At every location in the input, a matrix multiplication is performed and adds the result into the feature map.

Figure 6:
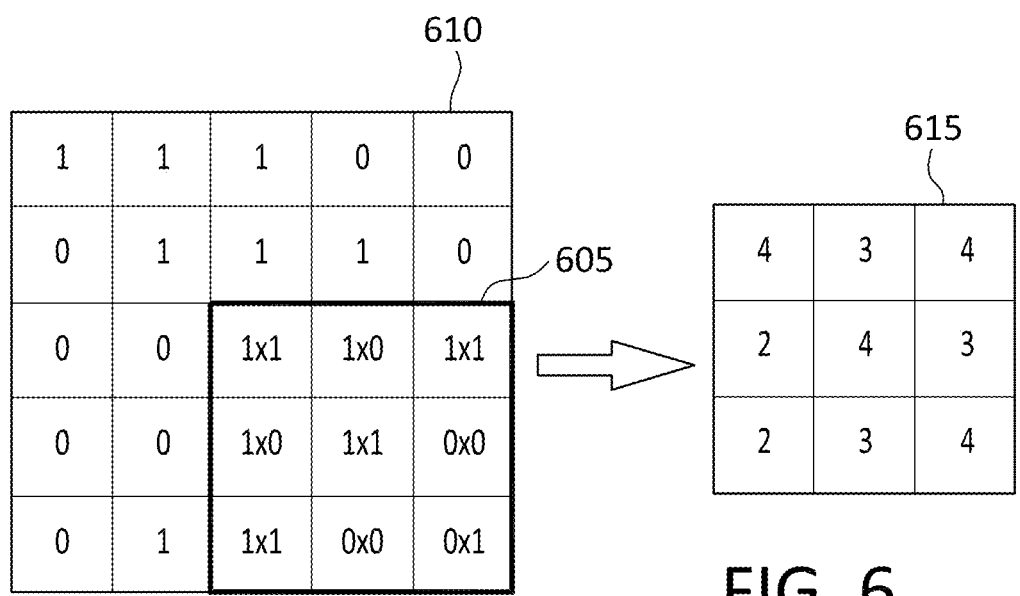
FIG. 6 illustrates an example of how the kernel filters an input into a feature map.

FIG. 6 illustrates an example of how the kernel filters an input into a feature map. The kernel 605 overlays the input 610 to produce one point 615 of the feature map 610 as shown. The other points of the feature map correspond to other positions of the kernel 605 over the input 610.

The Tx ports are matched with the Rx ports by carrying out the following steps. First, traffic data at the Tx and Rx ports are captured over a sequence of short time-intervals. For example, the number of packets transmitted or received over a fixed period of time. The time-sampled sequence data collected at each of the Tx ports is individually labelled with a distinct category, referred to as class (identified with an ID). This may just simply be integers. The CNN model is trained on each of the Tx ports time-sampled sequence data along with each of its individual classes. The trained CNN model is then used to predict each of the Rx port time sampled data. The output of this step is that each of the Rx port is now tagged with a unique class ID. For each of the Tx ports, its class ID obtained via the training step is compared with that of Rx port's class ID obtained by predicting the CNN on the Rx port data. Whenever there is a match of the IDs, the corresponding Tx and Rx ports are identified as being connected.

This CNN approach may be scaled up to use large amounts of data for a large number of ports. This is because of the following properties of CNN. The convolutional layer uses a kernel to filter the input vector into a feature map instead of the computationally expensive conventional matrix multiplication. The CNN uses sparse interactions because the kernel size is always smaller than the input. As a result, only a few parameters need to be stored and the output may be computed with fewer operations. The CNN shares parameters which means that rather than learning a separate set of parameters, the same parameter is used for more than one function in a model for every location.

Figure 7:
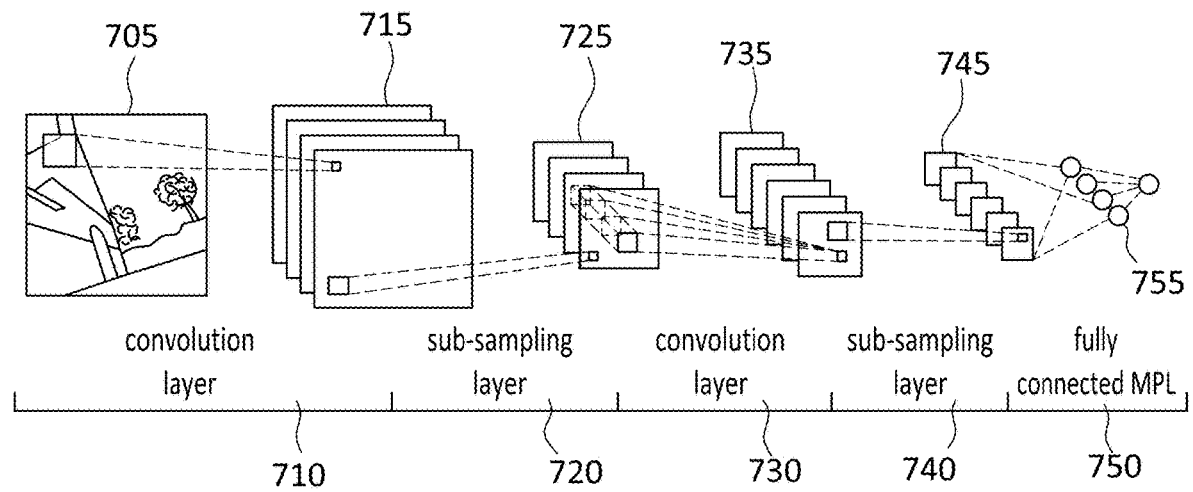
FIG. 7 illustrates the architecture of a CNN model that may be used to match Optical ports to IP ports.

FIG. 7 illustrates the architecture of a CNN model that may be used to match Optical ports to IP ports. A convolutional layer 710 is applied to the input 705 to produce four feature maps 715. A sub-sampling layer 720, for example max pooling, is applied to the four feature maps 715 to produce another four feature maps 725. Next, a convolutional layer is applied to the four feature maps 725 to produce six feature maps 735. Then another sub-sampling layer 740 is applied to the six feature maps 735 to produce another six feature maps 745. The outputs of the six feature maps 745 are fed into a fully connected multilayer perceptron 755 which produces a class ID. Training the CNN may involve the use of various hyper parameters as is known in the art.

Now the validation stage 150 will be described. The validation stage 150 verifies the identified matches and filters out the remaining ports. The heuristic results of matched cross domain links may be verified with help of IP-optical correlation. If the heuristic results have found multiple Rx port matches for a specific Tx, then multiple match is resolved using verification step.

Figure 8:
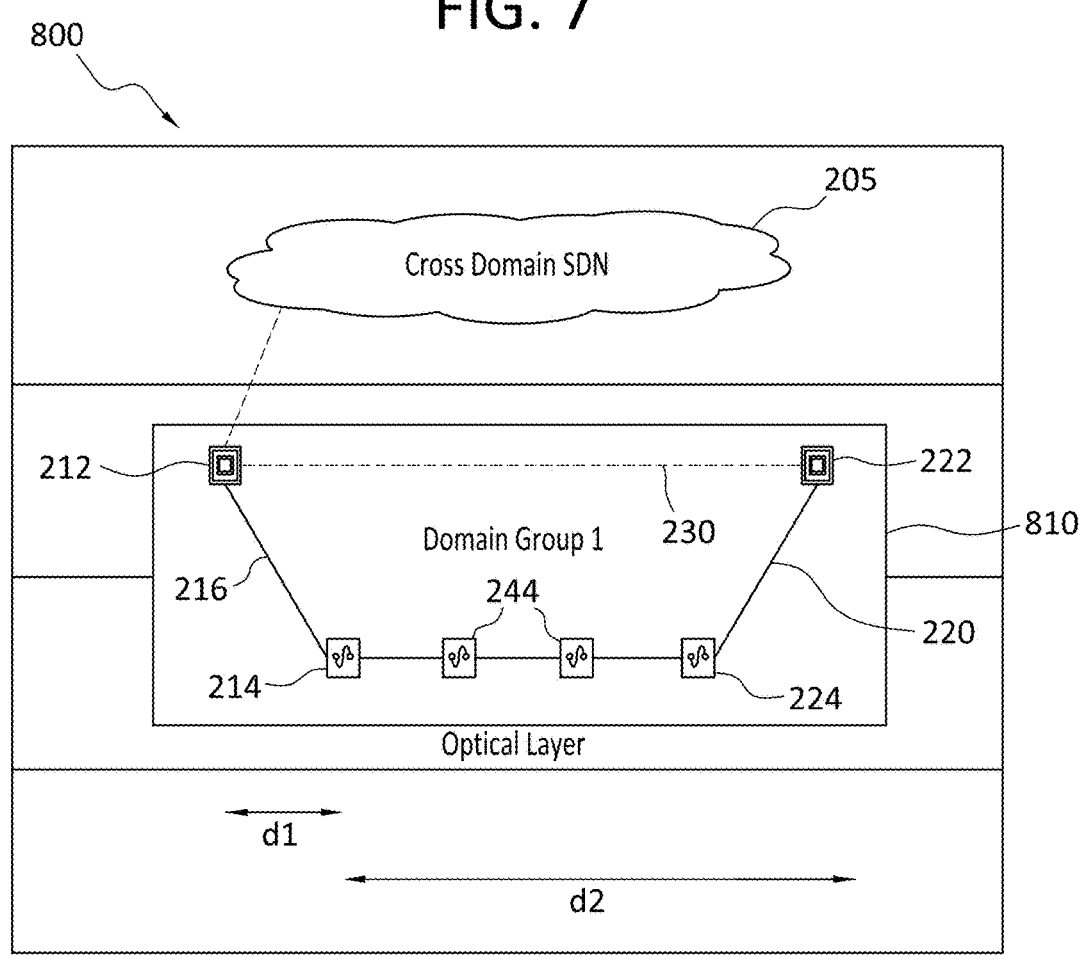
FIG. 8 illustrates a network and how the validation stage is applied to the network.

Matched IP-optical links which are identified as connected in the matching/filtering stage may be verified by tracing the IP-optical-IP path and comparing it with the corresponding LLDP/IGP session between the indirectly connected IP nodes. For example, if the following results are obtained (using FIG. 8): router node 212 is connected to optical node 216, and router node 222 is connected to optical node 226, and also if there is an optical data unit (ODU) starting from optical node 216 to optical node 226 (which may be obtained from an optical domain controller), then it may be concluded that there should be an indirect line between router node 212 and router node 222 with a functioning LLDP/IGP (interior gateway protocol) session between them. This conclusion may be cross verified by LLDP/IGP details from the IP domain controller. But with the given details of the four ports, human intervention may solve the remaining ambiguity using the distance of connected cross domain port will be closer to the non-connected cross domain port, i.e., in FIG. 8 d1<d2 to resolve the issue automatically.

IP-optical links which are verified by the procedure of the validation stage 150 may be pushed to the cross domain SDN controller database for further SDN related computation.

The embodiments disclosed herein provide the following improvements and benefits. The embodiments disclosed not only remove the need for manual intervention in identifying the IP-optical interfaces, but also provides a method that is scalable and sustains the accuracy of identifying the IP-optical interfaces as the network scales and changes. With the advancement of technology and network demand, service providers need to dynamically change their networks. The disclosed IP-optical discovery method provides a way to bring the dynamic changes to IP-optical network.

Also, discovering IP-optical links is fundamental to building a network topology for SDN controller. In the operational event of an IP node tearing down a link-layer connection with one optical end point and establishing a new connection with another, the change in the network can be expeditiously detected using IP-optical link discovery method. This change notification may be communicated to a SDN-controller, by IP-Optical discovery, after which SDN controller can take action to move around L2-VPN,L3-VPN services based on optical services provisioned with minimal traffic disruption or to configure new optical services for L2-VPN,L3-VPN services.

Similarly, the addition of a new IP-optical link is also automatically detected by the IP-optical link discovery method, based on which, the L2-VPN/L3-VPN services are correspondingly moved around to factor in the new addition of an IP-optical link. Furthermore, the IP-optical link discovery method also minimizes the manual planning effort for network deployment and modifications Also, the validation step may be used to verify manually added IP-optical links to the SDN database, and if the verification fails, the service provider may be alerted about the mismatch. Without this verification of manually added links, errors will have a cascading effect on the SDN services like L3-VPN, L2-VPN running on IP-Optical link.

The IP-Optical link discovery process may run on the SDN controller or any other convenient place in the network that has access to the needed data and sufficient processing power. The link discovery process may be run on a periodic basis and/or when any changes are made to the network.

The embodiments disclosed herein solve the technological problem of identifying IP-optical links so that the network topology is understood and so that network services may be properly managed. Previously, such links had to be identified manually when the new link is formed. Such a process was time consuming and error prone. The use of machine learning and other techniques allow for the accurate and fast identification of IP-optical links. Also, the embodiments used herein may be used periodically to detect changes to the network so that the network topology is always up-to-date.

The embodiments described herein may be implemented as software running on a processor with an associated memory and storage. The processor may be any hardware device capable of executing instructions stored in memory or storage or otherwise processing data. As such, the processor may include a microprocessor, field programmable gate array (FPGA), application-specific integrated circuit (ASIC), graphics processing units (GPU), specialized neural network processors, cloud computing systems, or other similar devices.

The memory may include various memories such as, for example L1, L2, or L3 cache or system memory. As such, the memory may include static random-access memory (SRAM), dynamic RAM (DRAM), flash memory, read only memory (ROM), or other similar memory devices.

The storage may include one or more machine-readable storage media such as read-only memory (ROM), random-access memory (RAM), magnetic disk storage media, optical storage media, flash-memory devices, or similar storage media. In various embodiments, the storage may store instructions for execution by the processor or data upon which the processor may operate. This software may implement the various embodiments described above.

Further such embodiments may be implemented on multiprocessor computer systems, distributed computer systems, and cloud computing systems. For example, the embodiments may be implemented as software on a server, a specific computer, on a cloud computing, or other computing platform.

Any combination of specific software running on a processor to implement the embodiments of the invention, constitute a specific dedicated machine.

As used herein, the term "non-transitory machine-readable storage medium" will be understood to exclude a transitory propagation signal but to include all forms of volatile and non-volatile memory.

Although the various exemplary embodiments have been described in detail with particular reference to certain exemplary aspects thereof, it should be understood that the invention is capable of other embodiments and its details are capable of modifications in various obvious respects. As is readily apparent to those skilled in the art, variations and modifications can be affected while remaining within the spirit and scope of the invention. Accordingly, the foregoing disclosure, description, and figures are for illustrative purposes only and do not in any way limit the invention, which is defined only by the claims.

What is claimed is:

1. A method of identifying IP-optical links in a network having a plurality of nodes, the method comprising:
grouping network nodes into discovery groups;
for each discovery group:
filtering ports of the nodes in the discovery group;
producing class IDs for each filtered port using a machine learning model, wherein the machine learning model matches each of a plurality of Tx ports to a respective Rx port tagged with a unique class ID;
matching IP ports to optical ports from the filtered ports using the class IDs of each port to identify IP-optical links; and
verifying the identified IP-optical links.

2. The method of claim 1, wherein the grouping of the network nodes into the discovery groups further comprises:
using k-means methods based on the client ports of the optical devices connecting to the IP devices.

3. The method of claim 1, wherein the grouping of network nodes into the discovery groups further comprises:
receiving a radial distance; and
identifying all the nodes in the network that fall within the received radial distance.

4. The method of claim 1, wherein the filtering of the ports further comprises:
removing all ports with no traffic.

5. The method of claim 1, wherein the filtering of the ports further comprises:
removing all IP-IP connected ports in a discovery group which have link layer discovery protocol (LLDP) peer ports.

6. The method of claim 1, wherein the machine learning model is a convolutional neural network model.

7. The method of claim 1, wherein the verifying of the identified IP-optical links further comprises:
tracing the IP-optical-IP path; and
comparing the traced IP-optical-IP path with the corresponding LLDP/IGP session between the indirectly connected IP nodes.

8. The method of claim 1, further comprising:
verifying any manually added IP-Optical links to the SDN controller by tracing the IP-Optical-IP path with the corresponding LLD/IGP session between the indirectly connected IP nodes.

9. A method of identifying IP-optical links in a network having a plurality of nodes, the method comprising:
grouping network nodes into discovery groups;
for each discovery group:
filtering ports of the nodes in the discovery group;
producing class IDs for each filtered port using a machine learning model, wherein producing the class IDs for each filtered port includes:
collecting a sequence of time-sampled data from all of the ports and forming an image using the collected data;
assigning different class IDs to all of the Tx ports;
training the machine learning model to learn the class ID for each of the Tx ports using the images formed for the Tx ports; and
inputting the images for all of the Rx ports into the machine learning model to assign a class ID to each of the Rx ports;
matching IP ports to optical ports from the filtered ports using the class IDs of each port to identify IP-optical links; and
verifying the identified IP-optical links.

10. A software defined network (SDN) controller for identifying IP-optical links in a network having a plurality of nodes, the SDN controller comprising:
a memory; and
a processor connected to the memory, wherein the processor is configured to:
group network nodes into discovery groups;
for each discovery group:
filter ports of the nodes in the discovery group;
produce class IDs for each filtered port using a machine learning model, wherein the machine learning model matches each of a plurality of Tx ports to a respective Rx port tagged with a unique class ID;
match IP ports to optical ports from the filtered ports using the class IDs of each port to identify IP-optical links; and
verify identified IP-optical links.

11. The SDN controller of claim 10, wherein the grouping of the network nodes into discovery groups includes using k-means methods based on the client ports of the optical devices connecting to the IP devices.

12. The SDN controller of claim 10, wherein the grouping of the network nodes into discovery groups includes receiving a radial distance and identifying all the nodes in the network that fall within the received radial distance.

13. The SDN controller of claim 10, wherein the filtering of the ports includes removing all ports with no traffic.

14. The SDN controller of claim 10, wherein the filtering of the ports includes removing all IP-IP connected ports in a discovery group which have link layer discovery protocol (LLDP) peer ports.

15. The SDN controller of claim 10, wherein the machine learning model is a convolutional neural network model.

16. The SDN controller of claim 10, wherein the verifying of the identified IP-optical links includes tracing the IP-optical-IP path and comparing the traced IP-optical-IP path with the corresponding LLDP/IGP session between the indirectly connected IP nodes.

17. The SDN controller of claim 10, wherein the processor is further configured to verify any manually added IP-Optical links to the SDN controller by tracing the IP-Optical-IP path with the corresponding LLD/IGP session between the indirectly connected IP nodes.

18. A software defined network (SDN) controller for identifying IP-optical links in a network having a plurality of nodes, the SDN controller comprising:
   a memory; and
   a processor connected to the memory, wherein the processor is configured to:
      group network nodes into discovery groups;
      for each discovery group:
         filter ports of the nodes in the discovery group;
         produce class IDs for each filtered port using a machine learning model, wherein producing the class IDs for each filtered port includes:
            collecting a sequence of time-sampled data from all of the ports and forming an image using the collected data;
            assigning different class IDs to all of the Tx ports;
            training the machine learning model to learn the class ID for each of the Tx ports using the images formed for the Tx ports; and
            inputting the images for all of the Rx ports into the machine learning model to assign a class ID to each of the Rx ports;
         match IP ports to optical ports from the filtered ports using the class IDs of each port to identify IP-optical links; and
         verify identified IP-optical links.

19. A non-transitory machine-readable storage medium encoded with instructions for execution by a software defined network controller, the non-transitory machine-readable storage medium comprising:
   instructions for grouping network nodes into discovery groups;
   for each discovery group:
      instructions for filtering ports of the nodes in the discovery group;
      instructions for producing class IDs for each filtered port using a machine learning model, wherein the machine learning model matches each of a plurality of Tx ports to a respective Rx port tagged with a unique class ID;
      instructions for matching IP ports to optical ports from the filtered ports using the class IDs of each port to identify IP-optical links; and
      instructions for verifying identified IP-optical links.

20. The non-transitory machine-readable storage medium of claim 19, wherein the filtering of the ports includes removing all IP-IP connected ports in a discovery group which have link layer discovery protocol (LLDP) peer ports.

* * * * *